United States Patent
Fujishima et al.

(10) Patent No.: US 7,359,735 B2
(45) Date of Patent: Apr. 15, 2008

(54) RADIO COMMUNICATION APPARATUS AND PACKET SCHEDULING METHOD

(75) Inventors: Kenzaburo Fujishima, Kokubunji (JP); Mikio Kuwahara, Hachioji (JP); Masanori Taira, Yokohama (JP); Koji Meguro, Yokohama (JP); Toru Okamoto, Yokohama (JP)

(73) Assignees: Hitachi, Ltd., Tokyo (JP); Hitachi Communication Technologies, Ltd., Tokyo (JP); Hitachi Advanced Systems Corporation, Yokohama-Shi (JP)

( * ) Notice: Subject to any disclaimer, the term of this patent is extended or adjusted under 35 U.S.C. 154(b) by 112 days.

(21) Appl. No.: 11/049,752

(22) Filed: Feb. 4, 2005

(65) Prior Publication Data

US 2005/0197162 A1 Sep. 8, 2005

(30) Foreign Application Priority Data

Mar. 3, 2004 (JP) ............................. 2004-058454

(51) Int. Cl.
*H04M 1/00* (2006.01)
(52) U.S. Cl. .................... 455/562.1; 455/25; 455/63.1; 455/63.4; 370/328; 370/334
(58) Field of Classification Search ................ 370/241, 370/395, 347, 444; 455/63.4, 69, 561, 562.1
See application file for complete search history.

(56) References Cited

U.S. PATENT DOCUMENTS

| | | | | |
|---|---|---|---|---|
| 5,907,809 A | * | 5/1999 | Molnar et al. ............ 455/456.2 |
| 6,522,643 B1 | * | 2/2003 | Jacomb-Hood et al. ..... 370/347 |
| 6,707,821 B1 | * | 3/2004 | Shaffer et al. ............ 370/395.4 |
| 6,757,253 B1 | * | 6/2004 | Cooper et al. ............... 370/241 |
| 7,031,742 B2 | * | 4/2006 | Chen et al. .................. 455/522 |
| 7,092,673 B2 | * | 8/2006 | Bevan et al. .................. 455/69 |
| 2004/0063468 A1 | * | 4/2004 | Frank .......................... 455/561 |

FOREIGN PATENT DOCUMENTS

JP          2003-110486          4/2003

* cited by examiner

*Primary Examiner*—Rafael Perez-Gutierrez
*Assistant Examiner*—Amancio González
(74) *Attorney, Agent, or Firm*—Antonelli, Terry, Stout & Kraus, LLP.

(57) ABSTRACT

A radio communication apparatus enhances cell throughput by adaptive selection of spatially multiplexed channels in consideration of interferences in a local cell and reducing load for calculation of array weights by storing them in advance as fixed values and outputting fixed beams. To reduce the calculation load for the adaptive selection of spatially multiplexed channels that takes interferences within the local cell into consideration, the radio communication apparatus adopts a packet scheduling method that selects a combination of fixed beams and determines the number of spatially multiplexed channels, based on the fixed beams for mobile apparatuses with packets waiting to be transmitted and pre-calculated correlative quantities of inter-beam interferences between these fixed beams.

12 Claims, 11 Drawing Sheets

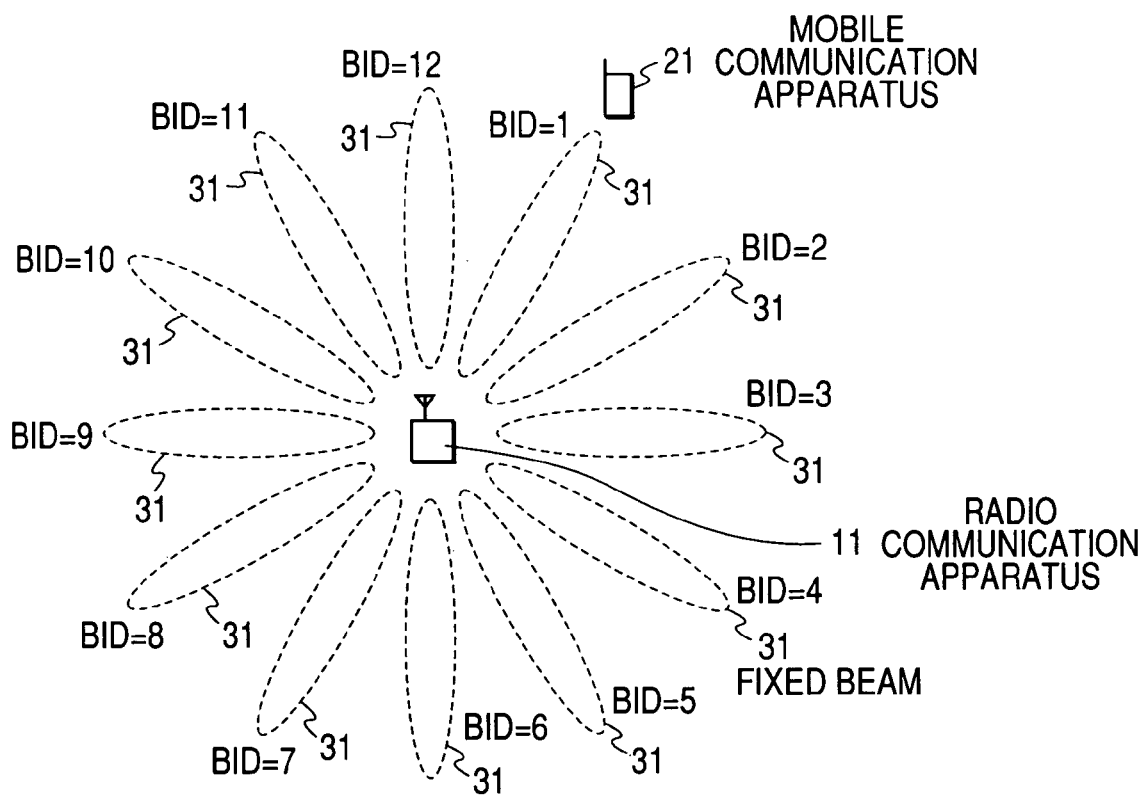

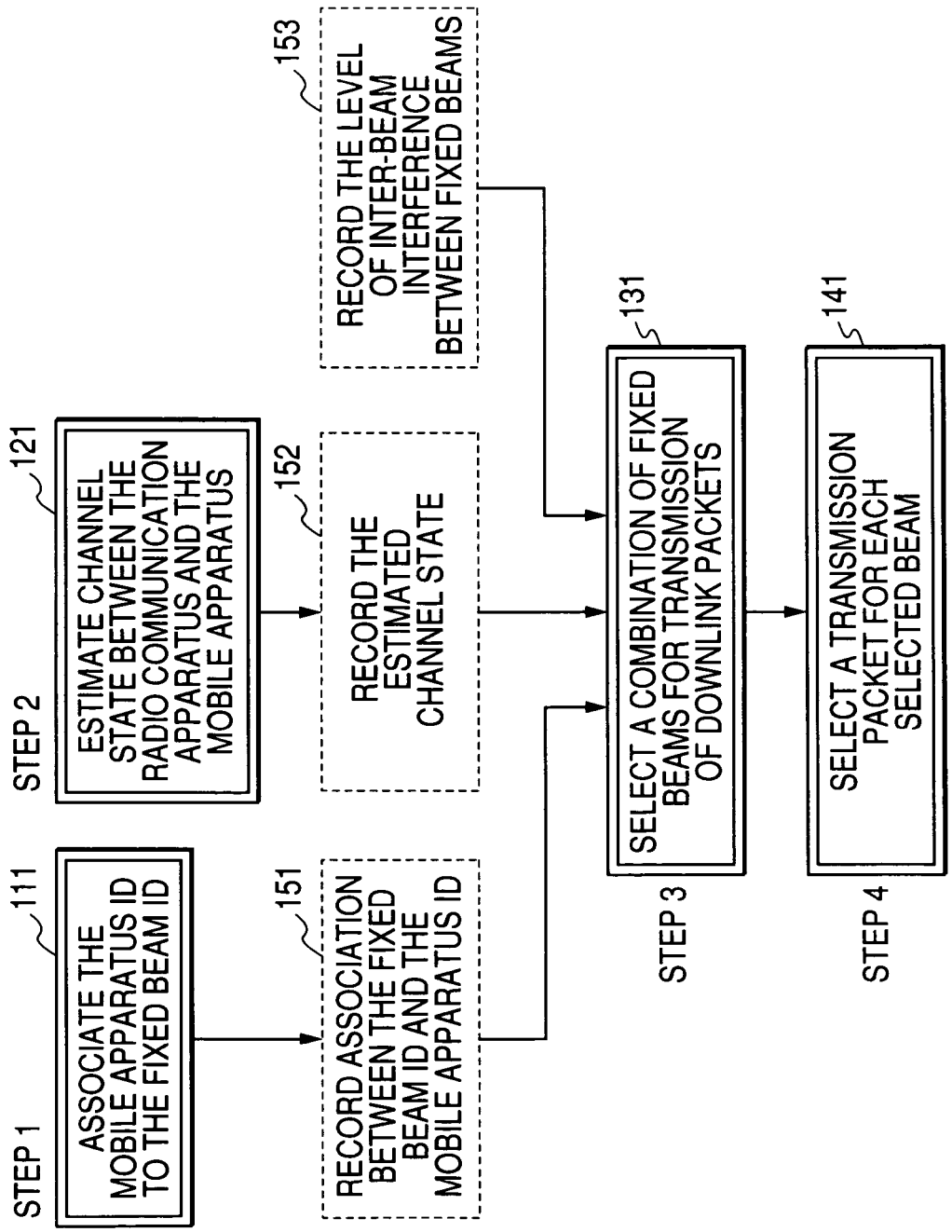

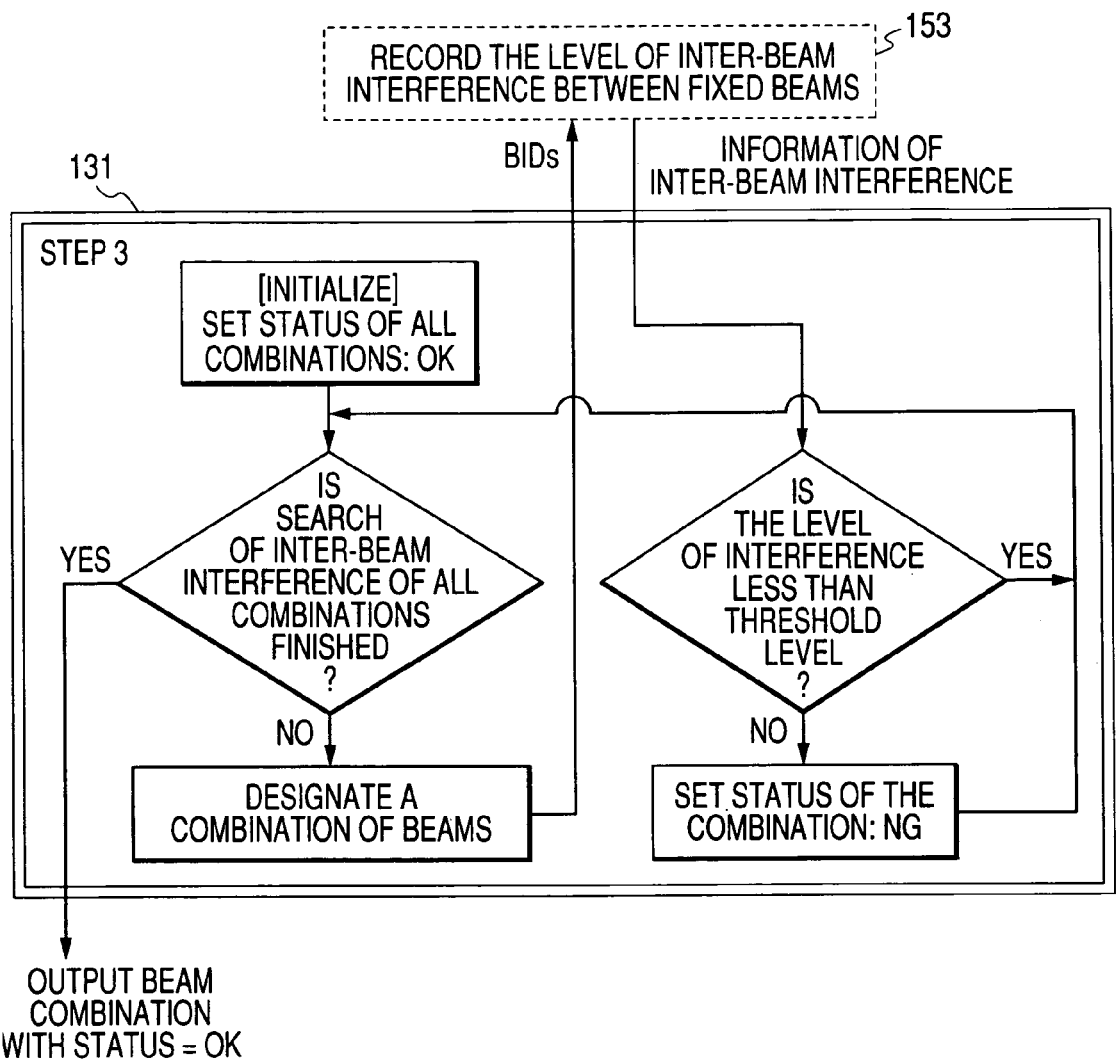

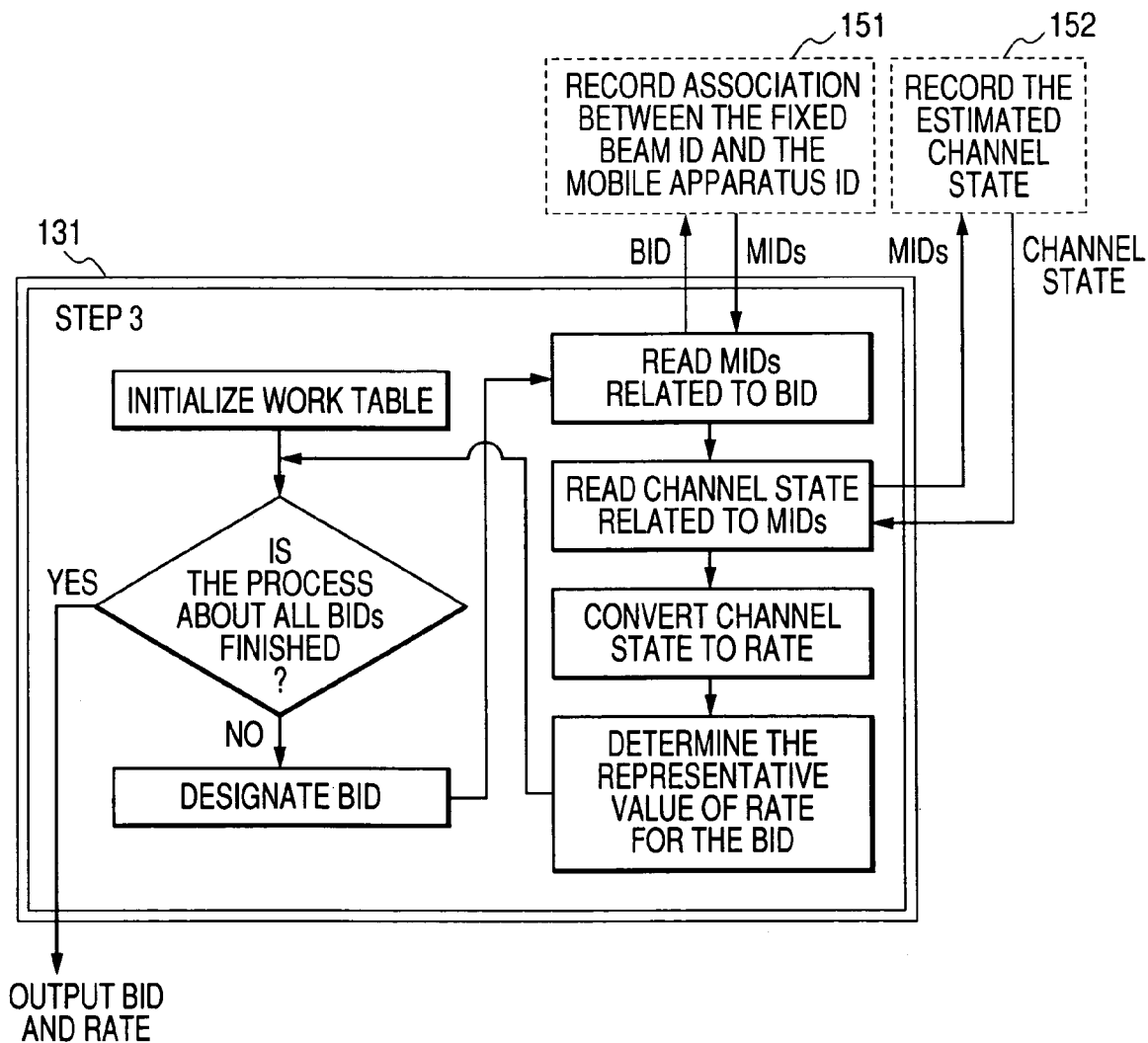

| BEAM ID | MOBILE IDs | | | AVERAGE RATE |
|---|---|---|---|---|
| 1 | 1 | 5 | | 200 |
| 2 | 2 | 6 | | 300 |
| 3 | 3 | | | 100 |
| 4 | 4 | 7 | 8 | 80 |

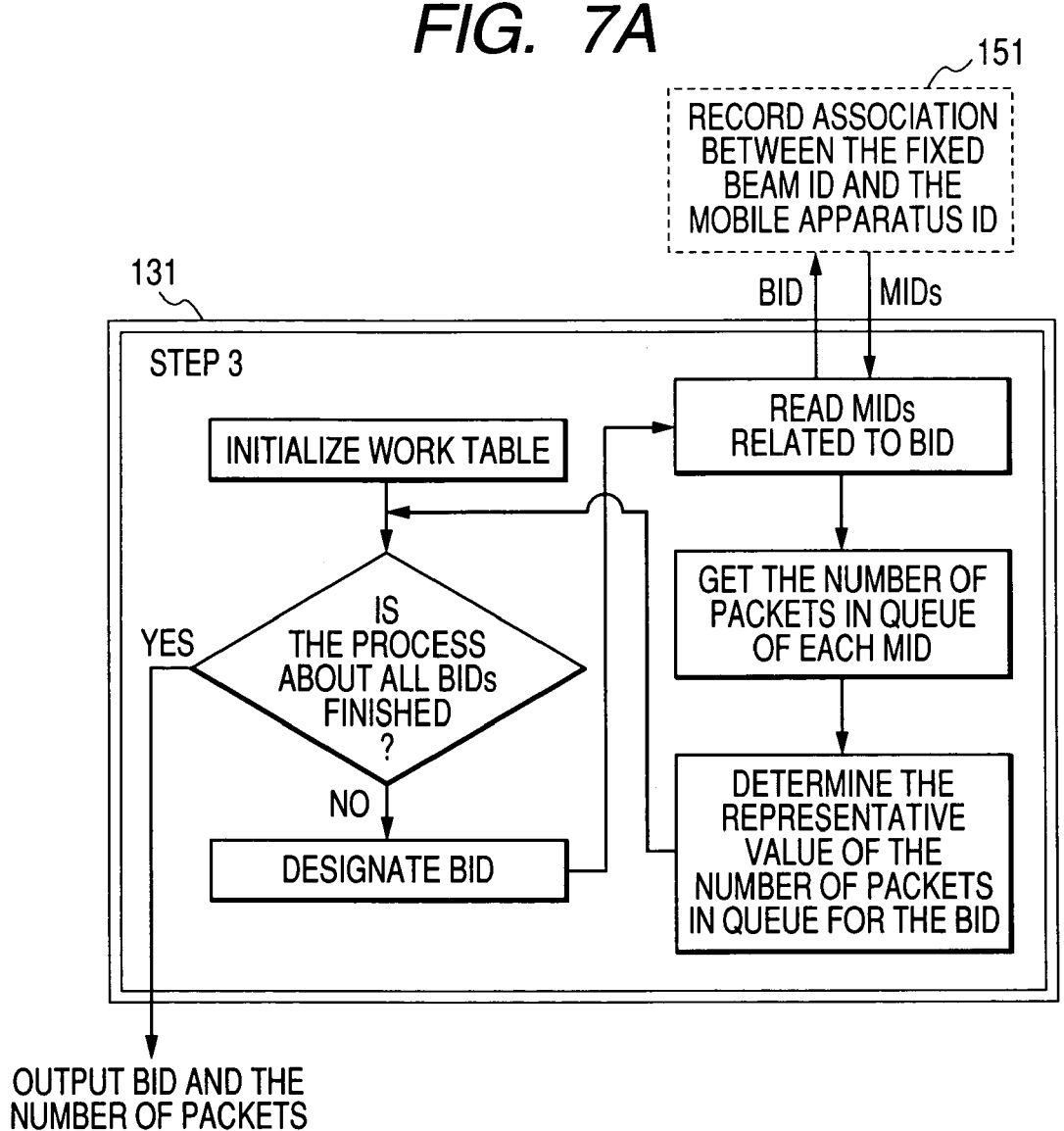

FIG. 11

| BID | INTER-BEAM INTERFERENCE (EXPECTATION VALUE) |
|---|---|
| 1, 2 | -12 [dB] |
| 1, 3 | -13 [dB] |
| 2, 3 | -11 [dB] |
| 1, 2, 3 | -8 [dB] |

.
.
.

RADIO COMMUNICATION APPARATUS AND PACKET SCHEDULING METHOD

CLAIM OF PRIORITY

The present application claims priority from Japanese application serial no. 2004-058454, filed on Mar. 3, 2004, the content of which is hereby incorporated by reference into this application.

BACKGROUND OF THE INVENTION (1) Field of the Invention

The present invention relates to a method and apparatus for scheduling packets in a cellular system where directional gain of base station is controlled in downlink communication.

(2) Description of the Related Art

In Japanese Unexamined Patent Publication No. 2003-110486 (Patent document 1), a radio channel scheduling method that can be applied for a smart antenna base station capable of concurrent communication with a plurality of mobile-stations is disclosed. In this prior art, downlink signal multiplexing transmission is performed on spatially multiplexed channels that are allocated to mobile communication apparatuses (hereinafter referred to as "mobile apparatuses") in descending order of the quality of communication with each mobile apparatus. Interferences occurring due to spatial multiplexing are suppressed by NULLs generated by the smart antenna. A feature of this method is dispensing with an intra-cell handover of a mobile apparatus by virtue of a varying directional gain pattern of array antennas responsive to mobile apparatus moving. This feature indicates that the directional gain pattern is frequently updated for mobile apparatus tracking.

In actual downlink communication, it is thought that a positional relationship between a mobile apparatus to be a destination of a transmission signal and another mobile apparatus for which the transmission signal brings about interference is varying and, consequently, the beam and NULL orientation of the directional gain pattern must be updated frequently. For a base station, updating the directional gain patterns for all users residing in its cell imposes a great computational burden. This poses a problem in which the frequency of directional gain pattern updates is not sufficient to follow a change in the propagation environment. This problem of prior art can be solved to a certain extent by providing the base station with a capability of outputting fixed directional gain patterns, thus dispensing with computation for directional gain pattern updates.

SUMMARY OF THE INVENTION

Based on the assumption that a radio communication apparatus (including a base station) outputs fixed directional gain (beams) patterns, objects of the present invention are: (1) to enhance the cell throughput by spatial multiplexing of downlink signals in a cellar system; and (2) to implement the spatial multiplexing by high-speed processing.

The first object (1) can be achieved by equipping the base station with a smart antenna and transmitting downlink signals with directional gain beams. However, as the number of spatially multiplexed channels increases, interferences in the local cell increase due to combinations of fixed beams employed for spatial multiplexing. It is anticipated that the mobile apparatus throughput declines each time one multiplex signal is added and the cell throughput becomes saturated or decreased. It is necessary, therefore, to find out both the number of spatially multiplexed channels and a combination of fixed beams that allow for maximizing the cell throughput.

It is thought that the number of spatially multiplexed channels and the combination of fixed beams that maximize the cell throughput vary from moment to moment, according to the present positions of mobile apparatuses which may be evenly distributed across the cell or locally concentrated and the states of the transmission channels. Thus, it is required to dynamically control the optimal number of spatially multiplexed channels and the optimal combination of fixed beams. There is a tradeoff between an increase in the number of spatially multiplexed channels and an involved increase in interferences between multiplexed signals; the former will increase, whereas the latter will decrease the cell throughput. The above dynamic control is equivalent to computation for determining an optimal point of this tradeoff.

From the above, in attaining the first object (1), a problem arises in establishing an adaptive control technique for selecting the number of spatially multiplexed channels and a combination of fixed beams, taking interferences in the local cell into consideration. The second object (2) means high-speed implementation of such adaptive control technique. For example, in a cdma2000 1xEV-DO system, since downlink signals are sequentially transmitted at intervals of 1.67 ms, it is desired to carry out the above adaptive control for each of transmission timings on the downlink. This is because, if adaptive control results are held for a certain period, even an optimal solution at the time of the adaptive control execution becomes non-optimal after a time elapse. In order to implement the adaptive control at intervals as short as 1.67 ms, mentioned above, speeding up the adaptive control is required.

The above-described problems are solved through a packet scheduling method of the present invention and a radio communication apparatus that implements the method as will be described below.

The packet scheduling method of the present invention is characterized by selecting a combination of fixed beams, based on the states of channels between each of mobile apparatuses and the radio communication apparatus, associations between mobile apparatuses' IDs and fixed beams' IDs, and correlative quantities of inter-beam interferences between the fixed beams, and selecting optimal mobile apparatuses to which packets are transmitted with each fixed beam in the selected combination.

The radio communication apparatus for implementing this method includes means for recording array weights of fixed beams, means for recording inter-beam interference quantities between fixed beams, means for allocating a fixed beam ID to a mobile apparatus ID, means for recording the fixed beam ID in association with the mobile apparatus ID, means for determining packet transmission rates, scheduling means for determining the fixed beam ID and the ID of mobile apparatus to which packets are to be transmitted, and means for generating packets.

As for the adaptive control technique for selecting the number of spatially multiplexed channels and a combination of fixed beams, taking interferences in the local cell into consideration, a key point is the packet scheduling method that selects a combination of fixed beams by referring to the correlative quantities of inter-beam interferences between fixed beams. On the other hand, as for high-speed implementation of the above technique, a key point is the radio communication apparatus that has a memory for storing array weights as fixed values and outputs fixed beams by referring to the memory. By applying fixed beams, the amount of computation for array weights for each mobile apparatus can be reduced. Further, because the array weights are fixed values, the inter-beam interference quantities are also fixed, and a high-speed adaptive control technique can be provided.

According to the present invention, enhancing the cell throughput and reducing the computational load of the radio communication apparatus can be achieved through the packet scheduling method and the method of selecting a fixed beams in consideration of inter-beam interferences in the radio communication apparatus that outputs fixed beams, and through the radio communication apparatus in which the inter-beam interferences and array weights are set and stored in memories in advance.

BRIEF DESCRIPTION OF THE DRAWINGS

FIG. 1A shows a conceptual diagram of fixed beams;

FIG. 1B shows an array weight table;

FIG. 3 shows a flowchart to illustrate a first embodiment of a packet scheduling method according to the present invention;

FIG. 4A shows a flowchart to illustrate a second embodiment of the packet scheduling method according to the present invention;

FIG. 4B shows a work table for the second embodiment of a packet scheduling method according to the present invention;

FIG. 5A shows a flowchart to illustrate a third embodiment of the packet scheduling method according to the present invention;

FIG. 5B shows a work table for the third embodiment of a packet scheduling method according to the present invention;

FIG. 7A shows a flowchart to illustrate a fifth embodiment of the packet scheduling method according to the present invention;

FIG. 7B shows a work table for the fifth embodiment of a packet scheduling method according to the present invention;

FIG. 11 shows a format example of records in an inter-beam interference memory in the radio communication apparatus according to the present invention.

DETAILED DESCRIPTION OF THE PREFERRED EMBODIMENTS

First, a method of forming fixed beams and a concept of inter-beam interference underlying the present invention will be discussed.

FIG. 1A is a conceptual diagram of a radio communication apparatus that outputs fixed beams.

The radio communication apparatus 11 outputs N fixed beams 31 of predetermined directional gain patterns, using N array antennas. The radio communication apparatus 11 stores in advance into a memory a set of weights (Weight 1, Weight 2 . . . , Weight N) to be assigned to the array antennas for transmitting packets with each of the fixed beams 31, each set of the weights being associated with the ID of each fixed beam (Beam ID, hereinafter abbreviated to BID). An array weight table 32 including this information is shown in FIG. 1B.

The radio communication apparatus 11 refers to the array weight table 32 based on the ID of a fixed beam, and retrieves array weights indicating a set of the weights assigned to the array antennas, to perform transmission and reception with the fixed beam. In the example of FIG. 1, when the radio communication apparatus 11 transmits a signal to a mobile apparatus 21, it retrieves the appropriate array weights by referring to the array weight table 32 with the key of BID 1, and sets the array weights for the array antennas. Then, a directional gain beam with ID 1 is formed to enable a narrow beam transmission to the mobile apparatus 21.

Figure 2A:
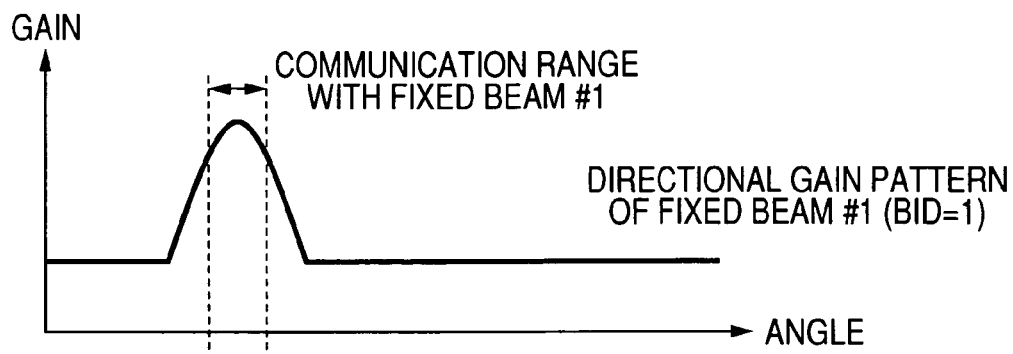
FIG. 2A to FIG. 2C show waveforms exemplifying interferences between fixed beams.
Figure 2B:
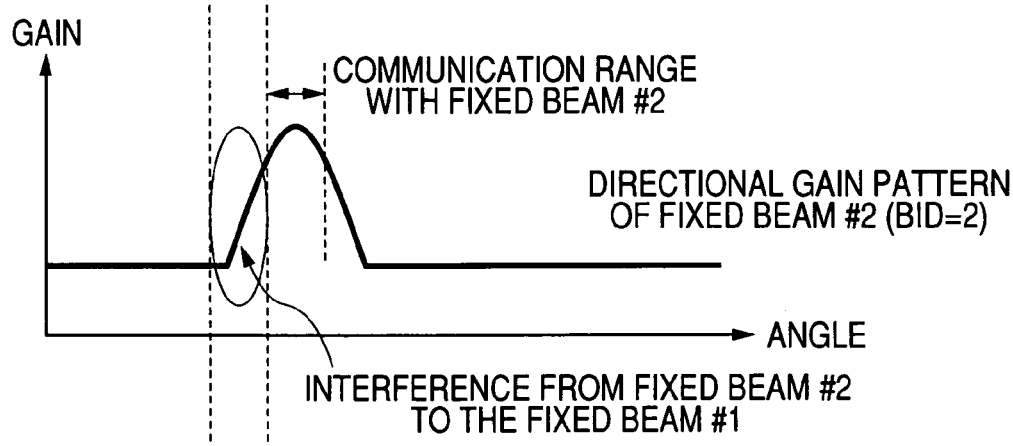
Figure 2C:
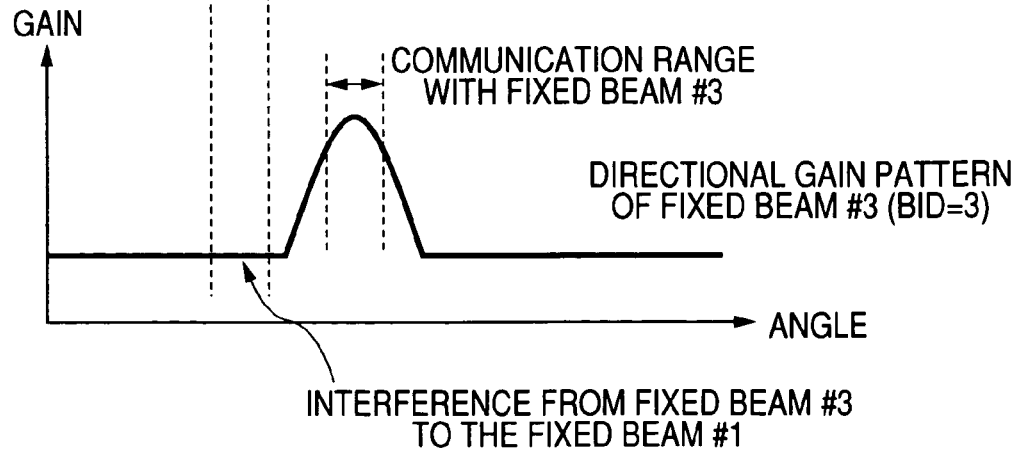

FIGS. 2A to 2C show waveforms for explaining interferences between fixed beams. These figures show directional gain patterns of three fixed beams (BIDs 1, 2, 3), respectively, with angles on the abscissa and gains on the ordinate. Each fixed beam has a communication range and is used for packet transmission to a mobile apparatus existing in the direction of an angle in the range from the base station.

Here, suppose that the fixed beam of BID 1 and the fixed beam of BID 2 are output simultaneously. For a packet being transmitted with the beam of BID 1, a packet being transmitted with the beam of BID 2 affects as an interference wave. Thus, when the beam of BID 1 is a desired beam, the interference by the beam of BID 2 is the encircled portion of its waveform. Because the beam of BID 3 is not output, it is not counted as an interference wave. It is reasonable that the expectation and maximum values of gain in the encircled portion are taken as the quantity of the inter-beam interference. Next, suppose that three fixed beams of BIDs 1, 2, 3 are output simultaneously. In this case, packets being transmitted with the beams of BID 2 and BID 3 are interference waves for a packet being transmitted with the beam of BID 1. Thus, when the BID 1 beam is a desired beam, the interferences by the beams of BID 2 and BID 3 must be added.

Figure 8:
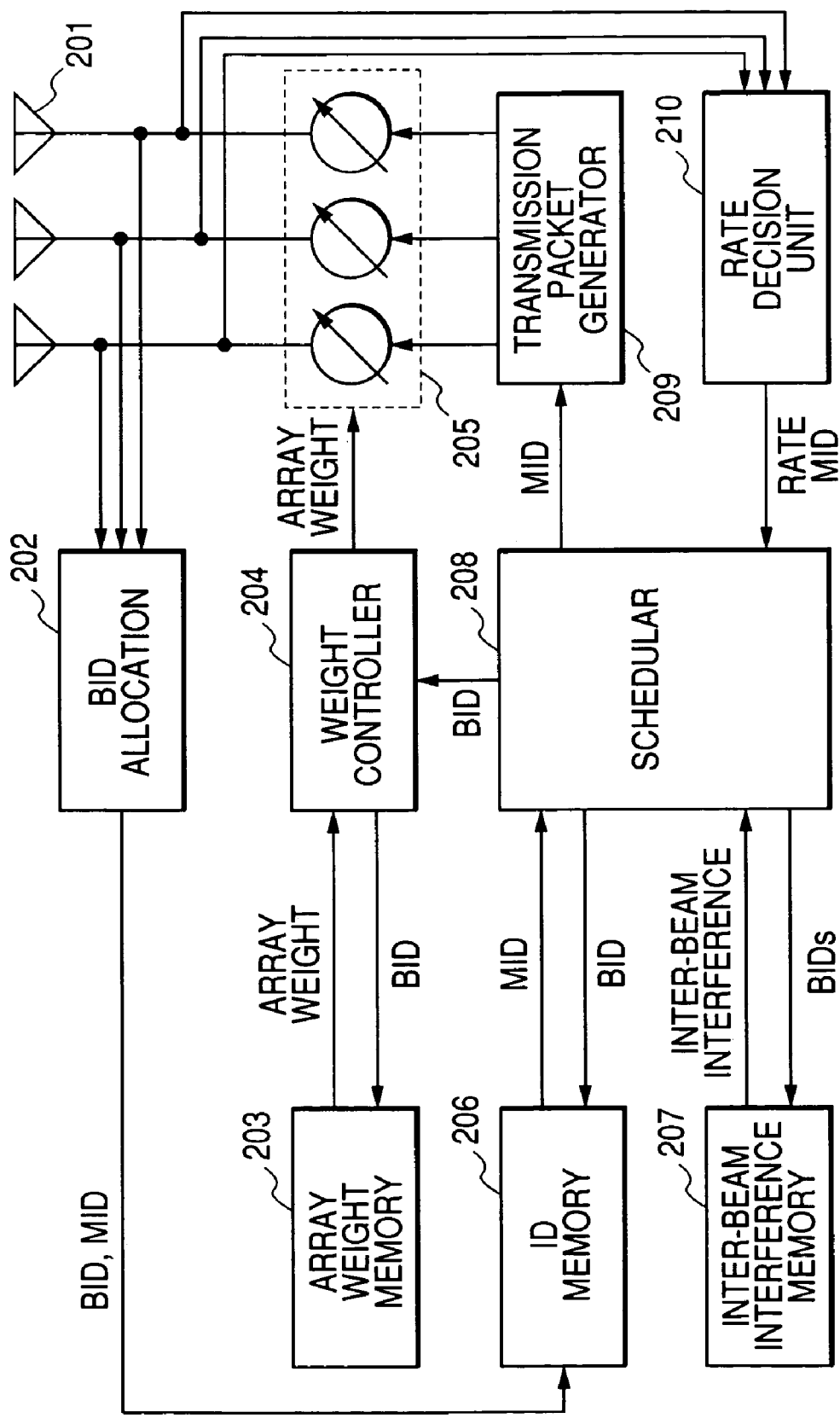
FIG. 8 shows a configuration example of a radio communication apparatus according to the present invention.

FIG. 8 shows a configuration example of the radio communication apparatus according to the present invention.

The radio communication apparatus is comprised of: array antennas 201; a BID allocation unit 202 for allocating a fixed beam ID (BID) to be employed for packet transmission to a mobile apparatus within the coverage of the radio communication apparatus; an ID memory 206 into which the ID of a mobile apparatus (Mobile ID, hereinafter abbreviated to MID) and the BID associated by the BID allocation unit 202 are recorded; an array weight memory 203 into which array weights for creating fixed beams are recorded; an inter-beam interference memory 207 into which combinations of BIDs corresponding to array weights are recorded in association with inter-beam interference quantities; a rate decision unit 210 for assessing the quality of the channel between the radio communication apparatus and a mobile apparatus and determining the rate at which packets are transmitted on the channel; a scheduler 208 for determining MIDs of mobile apparatuses to which downlink packets are to be transmitted and BIDs of beams to be employed for transmitting the packets, based on information obtained from the BID allocation unit 202, inter-beam interference memory 207, and rate decision unit 210 and information about requests for data transmission to each mobile apparatus; a transmission packet generator 209 for generating transmission packets from data addressed to a mobile apparatus having MID output from the scheduler 208 out of data addressed to every mobile apparatus for which a transmission request is submitted; a weight controller 204 for receiving the BIDs output from the scheduler 208, retrieving the array weights for the BIDs from the array weight memory 203, and determining the weights of the array antennas; and a beam former 205 for creating transmission beams by controlling the gain and phase of each array antenna based on the array weights.

Each of the array weight memory 203, ID memory 206, and inter-beam interference memory 207 is composed of one or more storage devices such as memory devices. Each of the BID allocation unit 202, weight controller 204, scheduler 208, transmission packet generator 209, and rate decision unit 210 is composed of one of more processing devices such as Digital Signal Processors (DSPs). In the array weight memory 203, fixed beam IDs are stored in association with antenna weights required to create the fixed beams. Such associations are stored, e.g., in the array weight table 32 shown in FIG. 1B. In the inter-beam interference memory 207, inter-beam interferences that will occur in simultaneous transmissions with a plurality of fixed beams are calculated in advance and stored.

FIG. 11 shows a format example of records in the inter-beam interference memory 207. A set of beam IDs given in the left column in FIG. 11 indicates the inputs to the inter-beam interference memory 207. The right column indicates outputs of this memory which is an expectation value of mutual interferences encountered by the beams with the IDs that were input. For example, when BID 1 and BID 2 are input, an average of interference I12 of the BID 2 beam to the BID 1 beam and interference I21 of the BID 1 beam to the BID 2 beam is given. I12 and I21 denote an expectation value of interference from the BID 2 in the BID 1 communication range and an expectation value of interference from the BID 1 in the BID 2 communication range, respectively. In this way, expectation values of interferences are stored in advance for a possible number of combinations of fixed beams that can be transmitted simultaneously. Although beam combinations up to three beams are indicated in the example of FIG. 11, a maximum number of fixed beams simultaneously transmittable is not so limited. The maximum number can be determined by a factor such as a total number of fixed beams.

Records in the array weight memory 203 and inter-beam interference memory 207 are set in advance on the radio communication apparatus and do not have to be updated during operation of the apparatus. Signals received from mobile apparatuses are input to the BID allocation unit 202 and the rate decision unit 210, but these two processors do not always have to perform array processing on the received signals. Based on signals received from a mobile apparatus, the BID allocation unit 202 determines a fixed beam ID optimum for packet transmission to the mobile apparatus, and stores the fixed beam ID in association with the ID (MID) of the mobile apparatus into the ID memory 206 when appropriate. An example of a method of determining an optimum fixed beam ID will be described later by referring to FIGS. 9 and 10.

The rate decision unit 210 determines the rate of transmission toward a mobile apparatus (downlink) based on the channel state between the radio communication apparatus and the mobile apparatus. The downlink channel state is usually estimated using signals received by the mobile apparatus. However, if Time Division Duplex (TDD) is used as a communication system, since the uplink channel toward the radio communication apparatus and downlink channels can be regarded as the same, channel state estimation may be performed for signals received by the radio communication apparatus. However, when the mobile apparatus carries out transmission power control, the radio communication apparatus cannot estimate the channel state correctly, unless knowing the actual transmission power of each of the mobile apparatuses.

From the above, situations where the radio communication apparatus can estimate the downlink channel, including Frequency Division Duplex (FDD), are rather limited. Therefore, this estimation is usually performed at the mobile apparatus. Specifically, each of the mobile apparatuses transmits, to the radio communication apparatus, estimated channel information or transmission rate information converted from the channel information, and the rate decision unit 210 of the radio communication apparatus extracts this information and eventually outputs the transmission rate to the scheduler 208. For example, in the case of cdma2000 1xev-DO, a Data Rate Control (DRC) signal is transmitted from each of the mobile apparatuses to the radio communication apparatus. The DRC is an index form of a transmission rate that is determined from channel estimation at the mobile apparatus. At the radio communication apparatus, the DRC index is extracted from the received signal and converted into the transmission rate.

The scheduler 208 collects information about requests for transmission to each mobile apparatus (whether there exist a request or requests, and quantities of data waiting to be transmitted) issued from a transmission data memory (not shown) or the like. The scheduler 208 comprehensively analyzes this information and other information such as transmission rates to each mobile apparatus which is notified from the rate decision unit 210, the mobile apparatus IDs associated with the fixed beam IDs which is obtained by referring to the ID memory 206, and the quantities of inter-beam interferences stored in the inter-beam interference memory 207, performs optimum transmission scheduling, and outputs beam IDs corresponding to the scheduling to the weight controller 204. Detailed Examples of the scheduling method will be presented later.

Based on the beam ID notified from the scheduler 208, the weight controller 204 refers to the array weight memory, outputs the array weight corresponding to the beam ID to the beam former 205, and notifies the transmission packet generator 209 of the mobile apparatus ID corresponding to the beam ID. Having received the mobile apparatus ID from the scheduler 208, the transmission packet generator 209 packetizes data addressed to the mobile apparatus with the MID out of data waiting to be transmitted, and outputs packets to the beam former 205. To transmit the packets input from the transmission packet generator 209, the beam former 205 forms the beams with the antenna weights notified from the weight controller 204. Outputs of the beam former.205 are transmitted from the array antennas 201.

Figure 9:
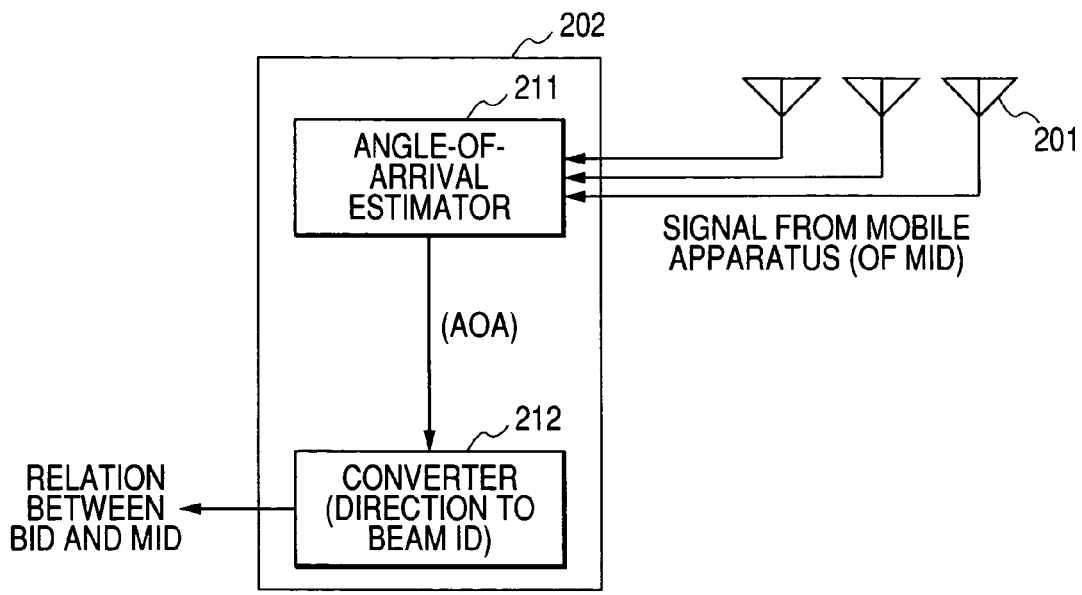
FIG. 9 shows a first configuration example of a BID allocation unit in the radio communication apparatus according to the present invention.

FIG. 9 shows a configuration example of the BID allocation unit 202 in the radio communication apparatus according to the present invention.

In this configuration example, the BID allocation unit 202 is provided with an angle-of-arrival estimator 211 for estimating the angle of arrival of signals transmitted from a mobile apparatus, and a direction-to-beam-ID converter 212 for outputting a fixed beam BID for packet transmission in that direction. Signals received from a mobile apparatus (MID) are input into the angle-of-arrival estimator 211, and the arrival direction (angle) of each of the received signal determined by an angle-of-arrival estimation algorithm is output. As angle-of-arrival estimation algorithms, e.g., Multiple Signal Classification (MUSIC) and Estimation of Signal Parameters via Rotational Invariance Techniques (ESPRIT) are known. The direction-to-beam-ID converter 212 converts the direction (angle) of arrival output from the angle-of-arrival estimator 211 to a BID. The direction of arrival can be converted to a BID by referring to a direction-to-BID conversion table memory or through calculation by a calculation formula prepared in advance.

Figure 10:
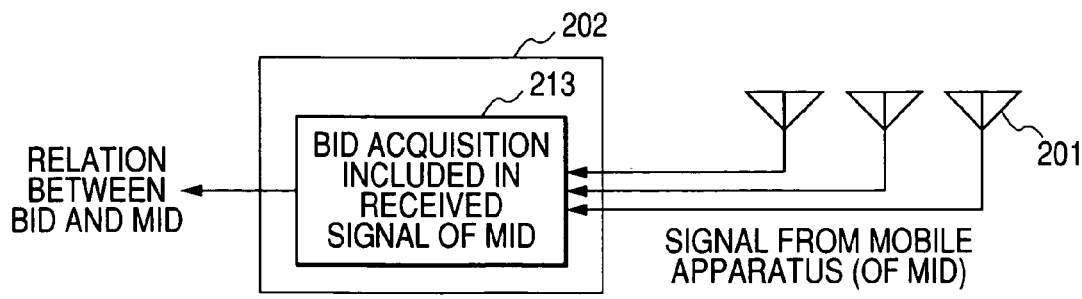
FIG. 10 shows a second configuration example of the BID allocation unit in the radio communication apparatus according to the present invention.

FIG. 10 shows another example of the BID allocation unit 202 in the radio communication apparatus according to the present invention.

In this configuration example, the BID allocation unit 202 includes a BID acquisition unit 213 for extracting a BID included in a signal received from a mobile apparatus. The BID acquisition unit 213 obtains the BID from a signal received from a mobile apparatus (MID) and outputs the MID and the BID. In this embodiment, the radio communication apparatus transmits in advance pilot signals including respective BIDs on the fixed beams to a mobile apparatus. The mobile apparatus measures the received signal level of each fixed beam, selects a fixed beam having the highest signal level, and sends the BID with the fixed beam back to the radio communication apparatus.

Figure 12:
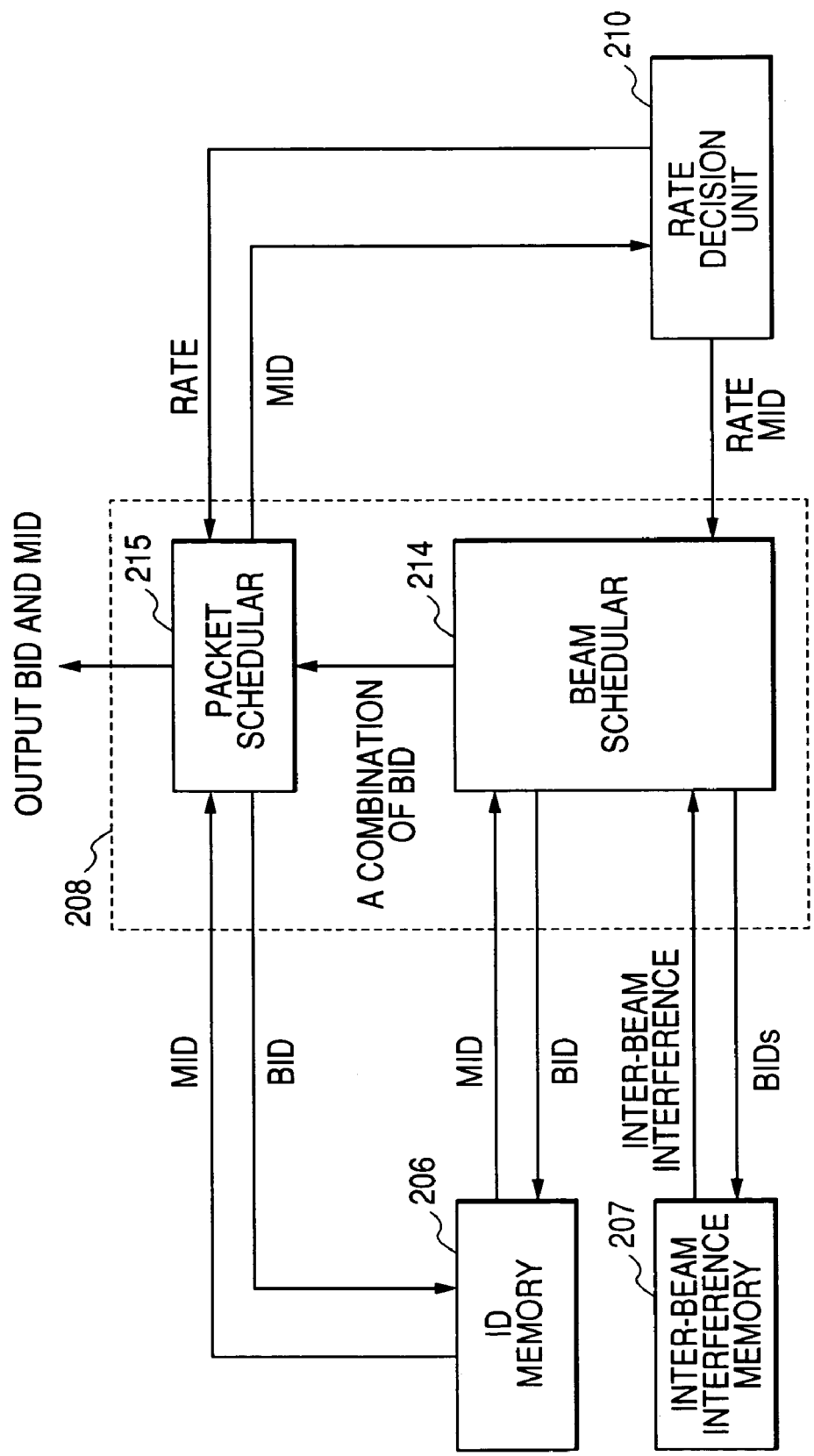
FIG. 12 shows a configuration example of a scheduler in the radio communication apparatus according to the present invention.

FIG. 12 shows a configuration example of the scheduler 208 in the radio communication apparatus according to the present invention.

The scheduler 208 includes a beam scheduler 214 for outputting one or more BIDs, and a packet scheduler 215 for receiving BIDs from the beam scheduler and determining mobile apparatuses to which packets are to be transmitted on each fixed beam. The beam scheduler 214 outputs a combination of BIDs through a method described in step 3 of the packet scheduling method as will be described later with reference to FIG. 2 and others, based on obtainable information on BIDs, MIDs, inter-beam interferences, and transmission rates. Processing performed by the packet scheduler 215 corresponds to step 4 of the packet scheduling method of the present invention and determines MIDs of mobile apparatuses to which packets are to be transmitted with each beam of the BIDs input thereto.

Next, some examples of the packet scheduling method that are performed by the scheduler 208 will be described.

FIG. 3 shows a first embodiment of the packet scheduling method according to the present invention.

A packet scheduling method shown in FIG. 3 comprises: a first step (111) in which the BID allocation unit 202 associates a mobile apparatus ID (MID) residing in the cell with a fixed beam ID (BID) of the radio communication apparatus and records the association between both IDs (151) into the ID memory 206 (151); a second step (121) in which the rate decision unit 210 estimates the channel state between the radio communication apparatus and a mobile apparatus and records the estimated channel state (152) for each mobile apparatus into the memory; a third step (131) in which the scheduler 208 selects a combination of fixed beam IDs to be employed for downlink packet transmission by referring to the records (151, 152) stored in the first step and the second step and the records of inter-beam interferences between fixed beams (153); and a fourth step (141) of determining mobile apparatuses to which packets are to be transmitted with each fixed beam determined in the third step (131).

The first step (111) and the second step (121) are independent of each other, because each step does not need output data (151, 152) from the other. Thus, the first step (111) and the second step (121) may be performed in parallel as shown or sequentially. This difference has no effect to the advantage of the present invention. In the third step (131), an MID can be retrieved by referring to the BID and MID association records (151) based on a BID key, and a BID can be retrieved by referring to the same records (151) based on an MID key. A channel state can be retrieved by referring to the channel state records (152) using an MID as a search key. By referring to the inter-beam interference records (153) based on a combination key of the BIDs created from a plurality of BIDs, the expectation value of interference that occurs with the combination of these BIDs can be retrieved. The inter-beam interference records (153) are calculated and set in advance on the radio communication apparatus. They are not updated during the operation of the radio communication apparatus.

FIGS. 4A and 4B show a second embodiment of the packet scheduling method according to the present invention. FIG. 4A shows a flowchart to be executed in the above third step to select a combination of fixed beams by referring to the inter-beam interferences between fixed beams, and FIG. 4B shows its work table.

The work table indicates combinations of BIDs (beam IDs), their serial numbers (No.), and status indicating whether multiplexing of each combination is allowable. Since the total number of combinations of BIDs is all combinations of two or more multiplexed beams (channels), it is expressed by formula 1, where M is the number of fixed beams. In FIG. 4B, an example where the number of fixed beams is three is presented. In this case, four combinations of BIDs are created.

$$\Sigma_M C_n (n=2 \text{ to } M) \tag{1}$$

The flowchart will be explained in order. First, the status field is initialized to OK for all combinations of BIDs in the work table. After the initialization, following steps (a) to (c) are repeated for all combinations of BIDs:

(a) specify a combination of BIDs;
(b) obtain an inter-beam interference quantity between the fixed beams of the specified combination; and
(c) if the inter-beam interference quantity exceeds a threshold, change the status of the combination to NG.

After the process is completed for all combinations, each combination of BIDs with the status being OK is output. However, since narrowing down to one combination of BIDs is not assured in this embodiment, it is advantageous to adopt possible methods for narrowing down to one combination in conjunction with further third to fifth embodiments which will be described with FIG. 5 to FIG. 7 and randomly selecting one of combinations with OK status. Methods in conjunction with the third to fifth embodiments will be discussed later in the sections relevant to each embodiment.

The above threshold is not required to be fixed. Setting the threshold high or low brings about different effects. If the threshold is high, the number of spatial multiplexing decreases, but the transmission rate per mobile apparatus rises. If the threshold is low, the number of spatial multiplexing increases, but the radio communication apparatus can accommodate more mobile apparatuses. A major object of the present invention is to enhance cell throughput and achieving this object is not affected essentially by such difference of the effect. However, it must be avoided to decrease the cell throughput performance due to a exceedingly large or small number of multiplexed beams. The threshold should be set in stepwise according to the number of multiplexed beams. Since an increase in the number of multiplexed beams increases inter-beam interferences, whereas the amount of data that can be transmitted increases, it is preferable to set a threshold that is optimum in making a balance between such advantage and disadvantage For instance, it is preferable to decreases the threshold as the number of multiplexed beams increases such that the threshold is set at −4 dB for two multiplexed beams and at −7 dB for three multiplexed beams, and so on.

If the threshold is not altered at all during the operation of the radio communication apparatus, a workable way is to record the scheduler outputs (priority in selecting a combination of BIDs) of this embodiment into a memory. If the threshold does not change, the scheduler outputs are always the same results and further reduction in calculation time is possible. The way of recording the scheduler outputs into a memory without altering the threshold is embraced in the scope of the preset invention. The inter-beam interferences will be detailed later.

FIGS. 5A and 5B show a third embodiment of the packet scheduling method according to the present invention. FIG. 5A shows a flowchart to be executed in the third step (131) to select a combination of fixed beams by referring to the states of the channels toward respective mobile apparatuses, and FIG. 5B shows its work table.

The work table indicates, in association with BIDs, MIDs and representative rate values per BID (Rate). The BIDs and MIDs are determined from the association records (151) between fixed beam IDs and mobile apparatus IDs. A unit of the rate may be any kind if it corresponds to transmission rate such as bits per second. In FIG. 5, the rate unit is kilobits per second (kbps).

The flowchart will be explained in order. First, the work table is initialized and cleared. After the initialization, following steps (a) to (e) are repeated for all BIDs:
 (a) specify a BID;
 (b) obtain all MIDs associated with the BID;
 (c) obtain the channel states for each MID obtained in (b);
 (d) convert the channel states obtained in (c) to transmission rates; and
 (e) determine a representative rate value of the BID.

After the process is completed for all BIDs, BID and rate pairs are output. In the step of converting the channel states to representative rate values, a table of mappings between channel states and transmission rates or a calculation formula for calculating a transmission rate from the state of a channel is required. The channel state is quantified in terms of Signal to Interference Ratio (SIR), Signal to Noise Ration (SNR), and the like. For example, if the table is used, transmission rate may be changed in stepwise according to the value of SINR. By preparing the table in which, e.g., 80 kbps is associated with an SINR range of −12 dB and above, 160 kbps with an SINR range of −9 dB and above, and so on, a transmission rate value can be output in response to an SINR input. This table is transformed into a step function as a calculating formula.

The representative rate value of a BID is indicative of a transmission rate that can be ensured on the beam; e.g., an average transmission rate for all mobile apparatuses associated with the beam, and a maximum transmission rate, etc. In addition to such indicator, a representative rate value may be determined based on Data Rate Control (DRC) information indicating a receivable data rate for the mobile apparatus for which the mobile apparatus reports to the base station a value assessed from measured channel state.

The scheduler outputs in this embodiment are a plurality of pairs of BID and rate and the number of pairs to be output is not limited. A plurality of pairs of BID and rate as many as the assumed spatially multiplexed beams may be output selectively in descending order of the transmission rate. However, multiplexing of fixed beams selected in descending order of the transmission rate may cause deterioration in the throughput performance, because of inter-beam interferences. Thus, it is desired to take measures, in conjunction with the second embodiment, to prevent interferences between fixed beams which are output in a multiplexed manner. That is one of objects of the present invention.

A concrete example of the third embodiment in conjunction with the second embodiment will be described below. First, the scheduler outputs all BID and rate pairs according to the third embodiment. Then, the scheduler outputs all combinations of BIDs with their inter-beam interference quantity being less than the threshold (Status is OK), according to the second embodiment. Finally, the rates of the BIDs in each combination are added and averaged and a combination of BIDs having the greatest average rate is determined as a solution.

Figures 6A, 6B:
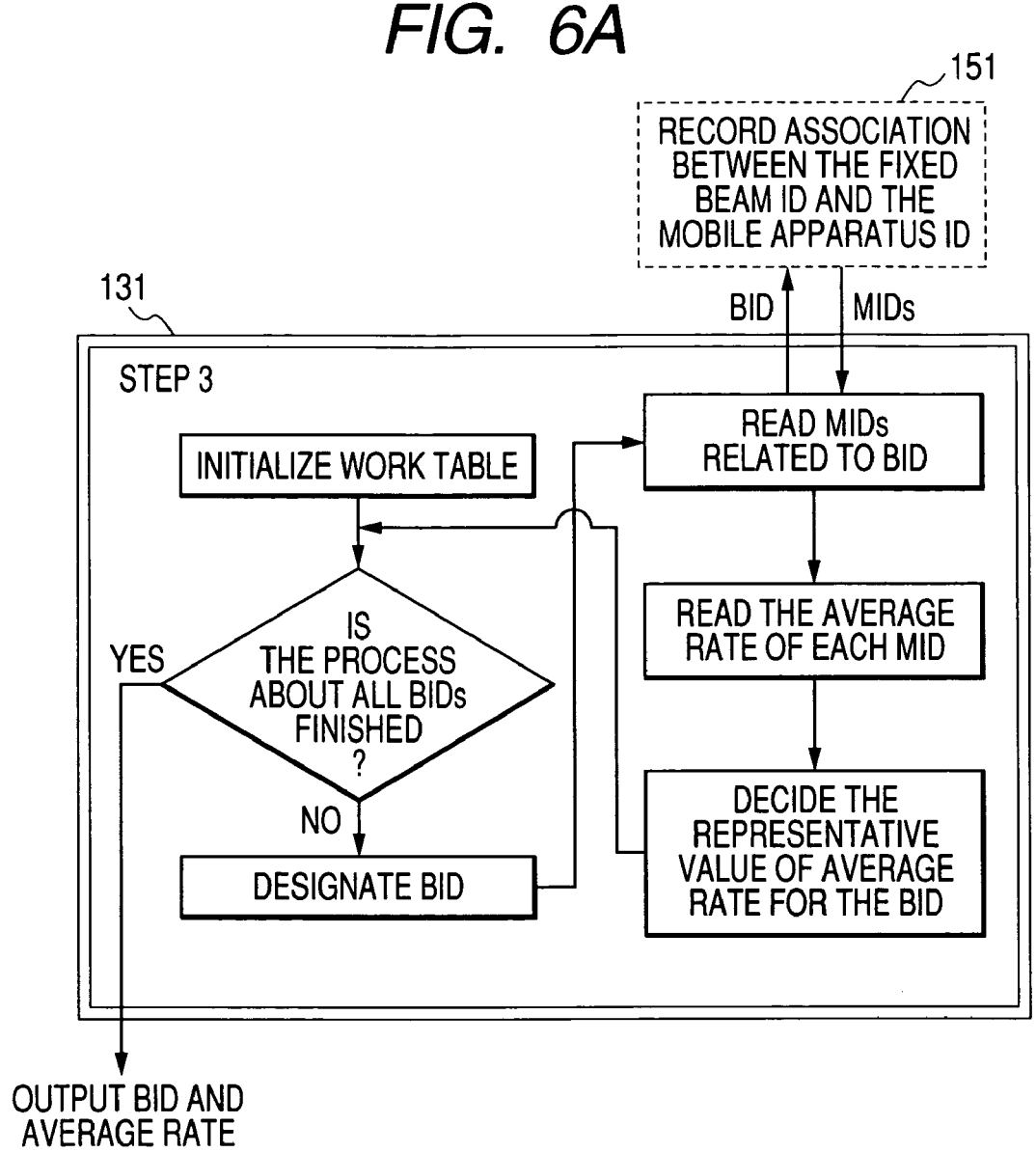
FIG. 6A shows a flowchart to illustrate a fourth embodiment of the packet scheduling method according to the present invention.
FIG. 6B shows a work table for the fourth embodiment of a packet scheduling method according to the present invention.

FIGS. 6A and 6B show a fourth embodiment of the packet scheduling method according to the present invention. FIG. 6A shows a flowchart to be executed in the third step (131) to select a combination of fixed beams by referring to average rates of transmission to each mobile apparatus, and FIG. 6B shows its work table.

The work table indicates, in association with BIDS, MIDs and average representative rate values per BID (Average Rates). The BIDs and MIDs are determined from the association records (151) between fixed beam IDs and mobile apparatus IDs. A unit of the average rate may be any kind of transmission rate such as bits per second. In FIG. 6, the average rate unit is kilobits per second (kbps).

The flowchart will be explained in order. First, the work table is initialized and cleared. After the initialization, following steps (a) to (d) are repeated for all BIDs:
 (a) specify a BID;
 (b) obtain all MIDs associated with the BID;
 (c) obtain an average transmission rate for each MID obtained in (b); and
 (d) determine a representative value of average transmission rate of the BID.

After the process is completed for all BIDs, pairs of BID and average rate are output. In the step (c) of obtaining an average transmission rate, average transmission rates must be recorded for each mobile apparatus and updated as necessary. Thus, memory allocation is required for this purpose. The representative value of average transmission rate of BID denotes poor transmission performance on the beam in the past during a predetermined period; e.g., an average transmission rate for all mobile apparatuses associated with the BID, a lowest one of the average transmission rates of the mobile apparatuses, etc.

The scheduler outputs in this embodiment are a plurality of pairs of BID and average rate and the number of pairs to be output is not limited. BID and rate pairs as many as the assumed spatially multiplexed beams may be output selectively in ascending order of the average transmission rate,. However, multiplexing of fixed beams selected in ascending order of the average transmission rate may cause deterioration in the throughput performance, because of inter-beam interferences. Thus, it is desired to take measures, in conjunction with the second embodiment, to prevent interferences among fixed beams output in a multiplexed manner and this is one of objects of the present invention.

A concrete example of the fourth embodiment in conjunction with the second embodiment will be described below. First, the scheduler outputs all pairs of BID and average rate according to the fourth embodiment. Then, the scheduler outputs all combinations of BIDs with their inter-beam interference quantity being less than the threshold (Status is OK), according to the second embodiment. Finally, the average rates of the BIDs in each combination are added and averaged and a combination of BIDs having the greatest average rate is determined as a solution.

By the way, if the fourth embodiment is combined with the third embodiment, it is possible to rank the BIDs by a new evaluation criterion of "representative rate vale" par "representative average rate value". This evaluation criterion is based on the same principle as for a proportional fairness method and inequality among the BIDs can be avoided by the effect of the denominator. In the above concrete example, by replacing the average transmission rate with this evaluation criterion, this scheme can be combined with the second embodiment and narrowing down to one combination of BIDs can be carried out.

FIGS. 7A and 7B show a fifth embodiment of the packet scheduling method according to the present invention. FIG. 7A shows a flowchart to be executed in the above third step (131) to select a combination of fixed beams by referring to the amount of data waiting to be transmitted, and FIG. 7B shows its work table.

The work table indicates, in association with BIDs, MIDs and representative values per BID of the amount of data waiting to be transmitted (Data). The BIDs and MIDs are determined from the association records (151) between fixed beam IDs and mobile apparatus IDs. A unit of data may be any unit in representing in formation quantity; e.g., bits, bytes, or units normalized by other manners may be used.

The flowchart will be explained in order. First, the work table is initialized and cleared. After the initialization, following steps (a) to (d) are repeated for all BIDs:
(a) specify a BID;
(b) obtain one or more MIDs associated with the BID;
(c) obtain the amount of data waiting to be transmitted for each MID obtained in (b); and
(d) determine a representative value of the amount of data waiting to be transmitted with the beam of the BID.

After completing the above processing for all BIDs, the scheduler outputs each pair of BID and the amount of data waiting to be transmitted. The step (d) of obtaining the amount of data waiting to be transmitted can be implemented by monitoring traffic queues for each mobile apparatus.

The representative value of the amount of data waiting to be transmitted on the BID is indicative of traffic on the beam; e.g., an average amount of data waiting to be transmitted for all mobile apparatuses associated with the BID, a total of data waiting to be transmitted for all mobile apparatuses, etc. The scheduler outputs in this embodiment are pairs of BID and the amount of data waiting to be transmitted and the number of pairs to be output is not limited. These pairs as many as the assumed spatially multiplexed beams may be output selectively in descending order of the amount of data waiting to be transmitted,. However, multiplexing of fixed beams selected in descending order of the number of packets waiting to be transmitted may cause deterioration in the throughput performance, because of inter-beam interferences. Thus, it is desired to take measures, in conjunction with the second embodiment, to prevent interferences between fixed beams which are output in a multiplexed manner and this is an object of the present invention.

A concrete example of the fifth embodiment in conjunction with the second embodiment will be described below.

First, the scheduler outputs all BIDs with the amount of data waiting to be transmitted per BID according to the fifth embodiment. Then, the scheduler outputs all combinations of BIDs with their inter-beam interference quantity being less than the threshold (Status is OK) according to the second embodiment. Finally, the amounts of data waiting to be transmitted for the BIDs in each combination are added and averaged and a combination of BIDs having the greatest average data amount is determined as a solution.

What is claimed is:

1. A packet scheduling method in a radio communication apparatus having array antennas and transmitting packets to a plurality of mobile apparatuses using a plurality of fixed beams created by the array antennas, the method comprising:
a first step of selecting one of the fixed beams for communication with each of said mobile apparatuses residing in the coverage of the radio communication apparatus, and associating the selected fixed beam with the mobile apparatus;
a second step of estimating respective states of radio channels toward the mobile apparatuses;
a third step of selecting a specific combination of fixed beams to be output, based on expectation values of inter-beam interference quantities each estimated in advance and stored, in a management table formed in a memory, in association with each of combinations of beam identifiers indicating a plurality of simultaneously transmittable fixed beams, associations between the mobile apparatuses and the fixed beams associated in said first step, and the states of radio channels estimated in said second step; and
a fourth step of generating by said array antennas, the fixed beams in said specific combination selected in said third step, and transmitting packets to the mobile apparatuses corresponding to the fixed beams in the selected combination,
wherein said specific combination of fixed beams is selected in said third step according to the state of radio channels toward mobile apparatuses associated with the fixed beams, from among a plurality of available combinations of fixed beams having been determined based on said management table to have inter-beam interference quantity less than a predetermined threshold.

2. The packet scheduling method according to claim 1, wherein said third step evaluates transmission rates for each of said mobile apparatuses or each of said fixed beams based on the states of said radio channels and preferentially selects as said specific combination, a combination of fixed beams including a fixed beam corresponding to a mobile apparatus having a high transmission rate or a fixed beam having a high transmission rate.

3. The packet scheduling method according to claim 1, wherein said third step preferentially selects as said specific combination, a combination of fixed beams including a fixed beam of low transmission performance or a fixed beam corresponding to a mobile apparatus for which the transmission performance is low, by referring to past transmission records for each of said fixed beams or for each of said mobile apparatuses associated with each fixed beam.

4. The packet scheduling method according to claim 1, wherein said third step preferentially selects as said specific combination, a combination of fixed beams including a fixed beam corresponding to a mobile apparatus for which the amount of packets waiting to be transmitted is large or a fixed beam for which the amount of packets waiting to be transmitted is large, by referring to the amount of packets waiting to be transmitted to each mobile apparatus.

5. The packet scheduling method according to claim 1, wherein said first step estimates an angle of arrival of signals received from each of said mobile apparatuses and associates the mobile apparatus with a fixed beam for transmitting a signal in the direction corresponding to the estimated angle of arrival.

6. The packet scheduling method according to claim 1, wherein said first step associates an ID of a fixed beam notified from each of said mobile apparatuses as an optimal beam for the mobile apparatus with the ID of the mobile apparatus.

7. A radio communication apparatus for transmitting packets to a plurality of mobile apparatuses using a plurality of fixed beams created by array antennas, said radio communication apparatus comprising:
a storage including a first management table for storing a plurality of combination of array weights by which the plurality of fixed beams are created and a second management table for storing expectation values of inter-beam interference quantities estimated in advance for each of combinations of beam identifiers indicating a plurality of simultaneously transmittable fixed beams;
a processor for packet scheduling;
a beam former for creating the beams to transmit the packets according to the array weights designated from the processor; and
array antennas for transmitting the packets, using the fixed beams created by the beam former,
wherein said processor performs; allocating one of said fixed beams to each of said plurality of mobile apparatuses; associating an identifier of each of said mobile apparatuses with one of identifiers of said fixed beams and storing the associations into a third management table formed in said storage; obtaining respective states of radio channels toward the plurality of mobile apparatuses; selecting a specific combination of fixed beams to be output, based on inter-beam interference quantities for each combination of simultaneously transmittable fixed beams indicated by said first management table, the associations between the mobile apparatus identifiers and fixed beam identifiers stored in said third management table, and the states of the radio channels; generating transmission packets to be transmitted to mobile apparatuses associated with the fixed beams in the specific combination; retrieving array weights corresponding to the fixed beams in the specific combination from said second management table; and outputting the array weights and the transmission packets to said beam former,
wherein said specific combination of fixed beams is selected, according to the state of radio channels toward mobile apparatuses associated with the fixed beams, from among a plurality of available combinations of fixed beams having been determined based on said second management table to have inter-beam interference quantity less than a predetermined threshold.

8. The radio communication apparatus according to claim 7, wherein said processor estimates the angle of arrival of signals transmitted from each of said mobile apparatuses and received by said array antennas and allocates a fixed beam in the direction corresponding to the estimated angle to each of said mobile apparatuses.

9. The radio communication apparatus according to claim 7, wherein said processor associates the ID of a fixed beam, which has been notified from a mobile apparatus as an optimal beam for the mobile apparatus, with the ID of the mobile apparatus.

10. The radio communication apparatus according to claim 7, wherein said processor evaluates transmission rates for each of said mobile apparatus or for each of said fixed beams based on the states of said radio channels, and preferentially selects as said specific combination, a combination of fixed beams including a fixed beam corresponding to a mobile apparatus at a high transmission rate or a fixed beam having a high transmission rate.

11. The radio communication apparatus according to claim 7, wherein said processor evaluates past transmission performance for each of said fixed beams or for each of said mobile apparatuses associated with one of said fixed beams, and preferentially selects as said specific combination, a combination of fixed beams including a fixed beam for which the past transmission performance is low or a fixed beam corresponding to a mobile apparatus for which the past transmission performance is low.

12. The radio communication apparatus according to claim 7, wherein said processor preferentially selects as said specific combination, a combination of fixed beams including a fixed beam corresponding to a mobile apparatus for which the amount of packets waiting to be transmitted thereto is large or a fixed beam for which the amount of packets waiting to be transmitted thereon is large.

* * * * *